W. W. TURNER.
WHEEL EXTRICATOR FOR AUTOMOBILES.
APPLICATION FILED SEPT. 6, 1916.
1,222,908.
Patented Apr. 17, 1917.
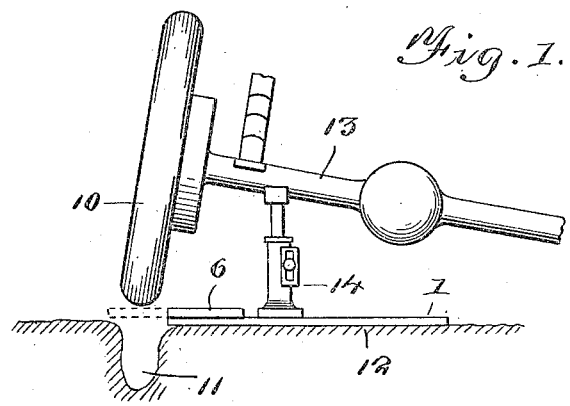
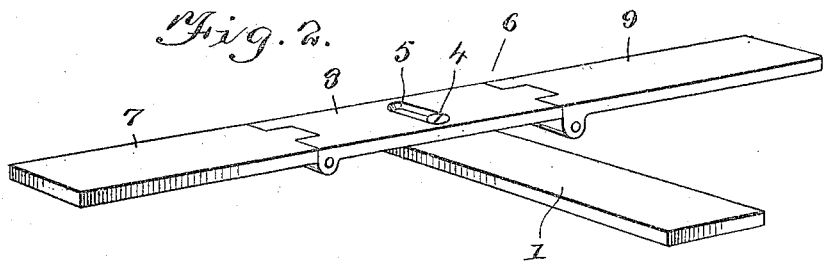
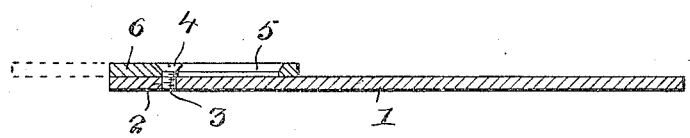
Inventor
W. W. Turner
Witness
E. R. Ruppert
By Victor J. Evans
Attorney

UNITED STATES PATENT OFFICE.

WILLIAM W. TURNER, OF PHILADELPHIA, PENNSYLVANIA.

WHEEL-EXTRICATOR FOR AUTOMOBILES.

1,222,908.

Specification of Letters Patent.

Patented Apr. 17, 1917.

Application filed September 6, 1916. Serial No. 118,772.

*To all whom it may concern:*

Be it known that I, WILLIAM W. TURNER, a citizen of the United States, residing at Philadelphia, in the county of Philadelphia and State of Pennsylvania, have invented new and useful Improvements in Wheel-Extricators for Automobiles, of which the following is a specification.

This invention relates to motor vehicle accessories, and has for an object to provide a simple and efficient device for facilitating the operation of extricating an automobile from ruts, muddy, sandy or slippery places whereby the driving wheels of the vehicle may be provided with a relatively solid foundation to enable the vehicle to be propelled.

It frequently occurs in the operation of a motor vehicle that the driving wheels thereof will become embedded in muddy or sandy soil so that sufficient friction cannot be maintained between the wheels and the soil to enable the vehicle to be propelled therethrough, thus rendering the machine dependent upon extraneous means to have the same pulled out of the bad roadway. The present invention has, therefore, for its prime object to provide means whereby a motor vehicle may be extricated from such conditions through the use of its own motive power.

To this end, the invention comprises, among other features, a portable device operable for use in conjunction with a vehicle elevating jack, whereby the embedded wheel or wheels of a motor vehicle may be lifted from out of engagement with a slippery roadbed, and when the wheel is in its elevated position, means are provided beneath the portable attachment which are designed to be placed beneath the wheel, so that when the wheel is again lowered, upon the removal of said jack, the same will rest upon said means to insure a relatively firm foundation, in order that the vehicle may be propelled over the bad section of the roadway.

Other objects will be in part obvious and in part pointed out hereinafter.

The invention accordingly consists in the features of construction, combination of elements and arrangement of parts which will be exemplified in the construction herein described and the scope of the application of which will be indicated in the following claims.

In the accompanying drawing, wherein is shown one of various possible embodiments of my invention, Figure 1 is an end elevation of a vehicle wheel and the axle housing thereof, illustrating the application of the present invention, Fig. 2 is a perspective view of the automobile extricator, and Fig. 3 is a vertical sectional view thereof.

Similar characters of reference denote corresponding parts throughout all the views of the drawing.

Referring more particularly to the drawing, the vehicle extricating device comprising the present invention in its preferred form comprises a base plate 1, of any desired length and formed of a suitable material. Formed adjacent to one extremity of the base is a threaded opening 2, designed for the reception of a screw or an equivalent 3. The screw 3 is provided with a flared head 4, which is operable in a slot 5 formed in a horizontally extending foldable tread plate 6.

The plate 6, in its preferred embodiment, consists of a plurality of pivotally connected section plates 7, 8 and 9, which, when in the position disclosed in Fig. 2 will present a flush continuous upper surface, designed to receive a wheel 10 of a motor vehicle. The plate 6 is provided with the pivoted sections, in order that the latter may be folded whereby the device will occupy but a minimum space when not in use, so as to be stored in some convenient receptacle carried by the vehicle.

In operation, in the event of a vehicle becoming embedded in a rut 11 of a roadway 12, so that the progress of the vehicle will be obstructed, the same may be readily removed from the rut, under its own power, through the agency of the device. This action is accomplished by positioning the base 1 beneath the axle housing 13, so as to extend substantially parallel to the latter. When in this position an ordinary vehicle elevating jack 14 is positioned upon the base 1 and is operated to elevate the wheel 10, in a manner that will be clearly understood. While the wheel is thus elevated, the plate 6 is forced outwardly so as to aline with the wheel 10 and to cover the rut 11. Upon the removal of the elevating jack the wheel 10 will rest upon the plate 6, whence power may be imparted to said wheel and a forward movement of the vehicle will be insured by reason of the firm foundation afforded the wheel 10 by the plate 6, as will be readily understood.

Having described the invention, what is claimed as new is:—

1. A vehicle extricating device of the class described, comprising a base plate, a wheel engaging plate slidably connected to one extremity of said base plate, means for limiting the movement of said sliding plate with respect to said base plate, and pivoted sections secured to the extremity of said sliding plate.

2. A vehicle extricating device of the class described, comprising a base plate, a wheel engaging plate having a slot formed therein, said slot being operable to receive a fixed stud carried by said base plate and foldable sections pivotally secured to the extremities of said sliding plate.

In testimony whereof I affix my signature.

WILLIAM W. TURNER.

Copies of this patent may be obtained for five cents each, by addressing the "Commissioner of Patents, Washington, D. C."